United States Patent
Tian et al.

(10) Patent No.: US 12,545,780 B2
(45) Date of Patent: Feb. 10, 2026

(54) FLEXIBLE METAL CLAD LAMINATES AND METHODS OF PREPARATION THEREOF

(71) Applicant: Notark Corporation, Houston, TX (US)

(72) Inventors: Jason Tian, Houston, TX (US); Ruidong Ding, Houston, TX (US); Vijay Mhetar, Houston, TX (US)

(73) Assignee: Notark Corporation, The Woodlands, TX (US)

( * ) Notice: Subject to any disclaimer, the term of this patent is extended or adjusted under 35 U.S.C. 154(b) by 280 days.

(21) Appl. No.: 18/468,830

(22) Filed: Sep. 18, 2023

(65) Prior Publication Data

US 2024/0067810 A1   Feb. 29, 2024

Related U.S. Application Data

(63) Continuation-in-part of application No. 18/344,988, filed on Jun. 30, 2023, and a continuation-in-part of application No. 17/644,146, filed on Dec. 14, 2021, now Pat. No. 11,873,369.

(60) Provisional application No. 63/375,889, filed on Sep. 16, 2022, provisional application No. 63/367,531, filed on Jul. 1, 2022, provisional application No. 63/130,130, filed on Dec. 23, 2020.

(51) Int. Cl.
  *C08L 25/16*   (2006.01)
  *C08J 5/18*    (2006.01)
  *C08K 9/06*    (2006.01)

(52) U.S. Cl.
  CPC ............... *C08L 25/16* (2013.01); *C08J 5/18* (2013.01); *C08J 2325/18* (2013.01); *C08J 2353/02* (2013.01); *C08K 9/06* (2013.01); *C08K 2201/005* (2013.01); *C08K 2201/011* (2013.01); *C08L 2203/16* (2013.01)

(58) Field of Classification Search
  CPC ......... C08L 25/16; C08L 2203/16; C08J 5/18; C08J 2325/18; C08J 2353/02; C08K 9/06; C08K 2201/005; C08K 2201/011
  See application file for complete search history.

(56) References Cited

U.S. PATENT DOCUMENTS

| | | | |
|---|---|---|---|
| 5,350,604 A * | 9/1994 | Crivello ................. | C08F 12/34 525/289 |
| 2002/0132053 A1* | 9/2002 | McCarthy ............. | C08G 61/00 427/372.2 |
| 2018/0171189 A1* | 6/2018 | Ingratta ................. | C08F 12/34 |
| 2021/0189132 A1* | 6/2021 | van Herrikhuyzen .. | C08L 93/04 |
| 2022/0195109 A1* | 6/2022 | Tian ....................... | C08F 12/34 |
| 2024/0002563 A1* | 1/2024 | Tian ....................... | C08L 65/00 |
| 2024/0002564 A1* | 1/2024 | Tian ....................... | C08J 5/244 |
| 2024/0067810 A1* | 2/2024 | Tian ....................... | C08F 212/36 |

OTHER PUBLICATIONS

Nuyken, et al., "Cationic Polymerization of bis(1-alkyvinyl)benzenes and related monomers". Makromol. Chem and Physics, Wiley, vol. 193, Jan. 1, 1992 (Jan. 1, 1992), pp. 487-500, XP001105931, ISSN: 0025-116X, DOI: 10.1002/MACP.1992.021930220.

* cited by examiner

*Primary Examiner* — Travis M Figg

(57) ABSTRACT

This disclosure relates to a film layer for use in flexible metal clad laminates. The film layer comprises a thermosetting composition comprising: a copolymer of (a) a diisoalkenylarene (DIAEA) and (b) a divinylarene (DVA) containing a mixture of m-divinylarene and p-divinylarene, in a mole ratio of (a) to (b) of 15:1 to 1:15; a second polymer; a filler and optional additives. Flexible metal clad laminates made with the film further comprises a metal foil bonded to the surface of the film. The thermosetting composition containing the DIAEA-DVA copolymer provides improved thermal stability at high temperature, excellent processability, and electrical properties, e.g., Dk and Df.

20 Claims, No Drawings

FLEXIBLE METAL CLAD LAMINATES AND METHODS OF PREPARATION THEREOF

RELATED APPLICATIONS

This application claims benefit to U.S. Provisional Application No. 63/375,889, filed on Sep. 16, 2022, which is incorporated herein by reference. This application is a continuation-in-part of U.S. patent application Ser. No. 17/644,146 having a filing date of Dec. 14, 2021, and U.S. patent application Ser. No. 18/344,988 having a filing date of Jun. 30, 2023, which are incorporated herein by reference.

FIELD

The disclosure relates to a flexible metal clad laminate (FMCL) comprising a layer containing a thermosetting composition based on a diisoalkenylarenes (DIAEA) copolymer, and methods of preparation thereof.

BACKGROUND

The field of wireless communication and broadband technology has progressed dramatically with growth in portable electronic devices such as mobile phones and tablets. To meet the requirements of transmission data volume and speed, the transmission frequency of circuits is by necessity increasing. Polymeric materials used in these high-power electronic devices must satisfy a number of critical thermal and electrical requirements to meet the required performance criteria for microelectronics applications. At the same time, there is also a demand for improved bending resistance of the material in a flexible metal clad laminate used in a circuit board. Many different polymers having good insulating properties and low dielectric constants have been used in FMCL, e.g., polyimide and liquid crystal polymer (LCP) etc.

There is still a need for improved polymers, e.g., thermosets having low dielectric constant, low dissipation factor, and good film forming properties, high heat resistance, good adhesion to a variety of substrates, and low moisture uptake, for use in FMCL.

SUMMARY

In one aspect, the disclosure relates to a film comprising a thermosetting composition, the thermosetting composition comprising, consisting essentially of, or consists of, based on the total weight of the thermosetting composition: a) a copolymer of (i) a diisoalkenylarene and (ii) a divinylarene containing m-divinylarene and p-divinylarene, in a mole ratio of (i) to (ii) of 15:1 to 1:15, the copolymer being present in an amount of 30-85 wt. %, b) a second polymer in an amount of 2-10 wt. %, c) a filler in an amount of 13-50 wt. % and d) an optional additive in an amount up to 10 wt. %. The film has a thickness of 10 to 300 μm, a dielectric constant (Dk) of <3.5, measured at 10 GHz, according to ASTM D2520, a dissipation Factor (Df) of <0.005, measured at 10 GHz, according to ASTM D2520, a coefficient of thermal expansion of <30 ppm/° C., as measured using TMA over a range of −50 to 300° C. according to ASTM E 228, a 90° peel strength to metal of >0.6 N/m performed according to IPC 650 2.4.19, a water uptake capacity of <0.5%, based on total weight of the film; and a tensile elongation of >10% according to IPC-TM 650 2.4.19.

In a second aspect, the film of aspect one, wherein the copolymer has a Gel content of >90%.

In a third aspect, the film of aspect one, wherein the m-divinylarene is m-divinylbenzene, the p-divinylarene is p-divinylbenzene, and wherein amount of m-divinylbenzene and p-divinylbenzene is up to 99 wt. %, based on total weight of the divinylarene.

In the fourth aspect, the film of aspect one, wherein divinylarene further comprises m-ethylvinylbenzene and p-ethylvinylbenzene in an amount of <35 wt. %, based on total weight of the divinylarene.

In the fifth aspect, a flexible metal clad laminate comprising, at least one film containing the thermosetting composition of aspect one, and a copper foil bonded to at least one surface of the film.

DESCRIPTION

The following terms will be used throughout the specification:

"At least one of [a group such as A, B, and C]" or "any of [a group such as A, B, and C]," or "selected from [A, B, and C], and combinations thereof" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C.

"Cured" or "cross-linked" is used interchangeably and refers to the formation of covalent bonds linking one polymer chain to another or linking one polymerized repeating unit to another in the same polymer chain, thereby altering the properties of the material.

"Molecular weight" or $M_w$ refers to the polystyrene equivalent molecular weight in g/mol of a polymer block or a block copolymer. $M_w$ can be measured with gel permeation chromatography (GPC) using polystyrene calibration standards, such as is done according to ASTM 5296. The GPC detector can be an ultraviolet or refractive index detector or a combination thereof. The chromatograph is calibrated using commercially available polystyrene molecular weight standards. $M_w$ of polymers measured using GPC so calibrated are polystyrene equivalent molecular weights or apparent molecular weights. $M_w$ expressed herein is measured at the peak of the GPC trace and are commonly referred to as polystyrene equivalent "peak molecular weight," designated as $M_p$.

"Substantially Gel-Free" refers to a polymer with <10, or <8, or <5, or <3, or <2, or <1 wt. % of solid matter (i.e., insoluble polymer) in a hydrocarbon solvent, e.g., toluene, cyclohexane, methyl-ethyl ketone (MEK), xylene, etc., or a mixture of hydrocarbon solvents.

"Gel Content" refers to the insoluble contents of a cured polymer composition in toluene as a percentage of the cured polymer composition (prior to immersing in a hydrocarbon solvent). For example, for a Gel Content of >90 wt. %, toluene extractable is <10 wt. %); for a Gel Content of >95 wt. %, toluene extractable is <5 wt. %, and a Gel Content of >98 wt. % refers to a toluene extractable of <2 wt. %.

"Gel Content Test" refers to a measurement of a Gel Content by placing a sample of a cured polymer composition having a weight G1 in 20 times volume of toluene, for a period of 4 hours at room temperature. Content in toluene is then filtered to recover the solid portion of the cured polymer composition, then dried to fully remove the solvent, and weighed, giving the insoluble content G2. Gel Content is calculated as (G2/G1). In embodiments, the Gel Content can also be measured by soaking the sample of the cured polymer composition at 90° C. for 9 hours followed by filtration of solid portion, drying, and recording weight.

"Solubility Test" refers to a measurement of a solubility by placing a polymer/copolymer sample in about 10 times volume of a hydrocarbon solvent, e.g., toluene, shake well and leave up to 4 hours at room temperature. Afterwards, examine the polymer/copolymer in the solvent by visual observation to see whether it has dissolved completely or partially. Decant or filter the content to measure weight of the remaining polymer/copolymer, after drying, to calculate weight of the dissolved polymer/copolymer.

"Swelling Content" refers to a weight difference (W %) of a weight of a cured polymer composition after being immersed in toluene until fully saturated (W2), i.e., the sample weight remains the same after a period of time, not soaking any more toluene, and the weight of the cured polymer composition before immersion (W1): W %=(W2−W1)/W1*100.

"Anti-Scorching Agent" refers to an additive to deactivate/terminate radicals prematurely generated during processing, shipping, storage, or the like, in a polymer/composition, with the reaction with the free radicals.

Df indicates "Dissipation Factor" or "loss tangent" (Df) and is a measure of loss rate of electrical energy in a dissipative system.

Dk indicates dielectric constant or permittivity.

"Conductive layers" or "Conductive foils" refers to metal layers or metal foils (thin compositions having at least 50% of the electrical conductivity of a high-grade copper).

"DIAEA" refers to any of 1,3-diisoalkenylarene, 1,4-diisoalkenylarene and combinations of the 1,3- and 1,4 isomers.

"DVB" refers to divinyl benzene.

"DVA" refers to divinyl arene.

"DIPEB" refers to diisopropenylbenzene. For example, 1,3-DIPEB refers to 1,3-diisopropenylbenzene.

"DIAEA-DVA copolymer" or "DIAEA-DVA polymer" or "DIAEA copolymer" refers to a copolymer of DIAEA and divinylarene (DVA) monomers, and optionally other polymerizable monomer(s) different from DIAEA and DVA.

Film may be used interchangeably with layer, or film layer.

This disclosure relates to a flexible metal clad laminate comprising a film layer containing a thermosetting composition comprising: a) a copolymer of (i) a diisoalkenylarene (DIAEA) and (ii) a divinylarene (DVA) containing m-divinylarene and p-divinylarene, in a mole ratio of (i) to (ii) of 15:1 to 1:15; b) a second polymer; c) a filler and optional additives. The flexible metal clad laminate further comprises a metal foil bonded to the surface of the film layer. The thermosetting composition containing the DIAEA-DVA copolymer provides improved thermal stability at high temperature, excellent processability, and electrical properties, e.g., Dk and Df.

(DIAEA-DVA Copolymers)

The DIAEA-DVA copolymer can be obtained from DIAEA, DVA, and optionally other polymerizable monomers by cationic polymerization in the presence of a Lewis acid or a Bronsted acid catalyst. In embodiments, the copolymer comprises: polymerized DIAEA in amounts of 30-95, or 35-90, or 40-80, or 20-60, or 30-70 wt. %; polymerized DVA in amounts of 5-70, or 10-65, or 20-60, or 40-80, or 30-70 wt. %; and optionally other polymerized monomers in amounts of 0-15, or 1-12, or 2-10, or 5-15 wt. %, based on total weight of the copolymer.

In embodiments, the DIAEA-DVA copolymer has a mole ratio of DIAEA to DVA of 15:1 to 1:15, or 12:1 to 1:12, or 10:1 to 1:10, or 8:1 to 1:8, or 5:1 to 1:5, or 4:1 to 1:4, or 3:1 to 1:3, or 2:1 to 1:2, or 1:1.

(DIAEA Monomers). In embodiments, the copolymerized DIAEA monomer comprises at least one of repeat units (A), (B), (C), and (D) whose structures are shown below, where $R^1$ is H or a $C_1$-$C_8$ alkyl group. The DIAEA-DVA copolymer can have any order of the repeat units of copolymerized DIAEA and DVA monomers.

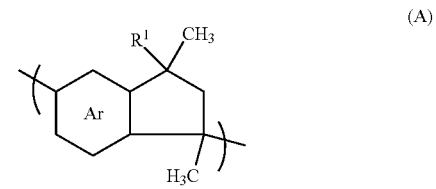

(A)

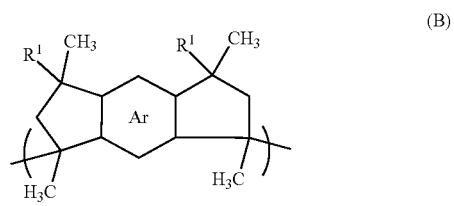

(B)

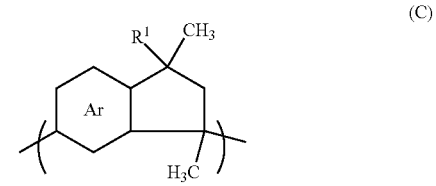

(C)

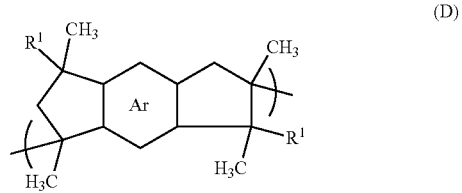

(D)

Non-limiting examples of DIAEA monomers to produce the copolymer include compounds having structures (I) 1,3-diisoalkenylarene, (II) 1,4-diisoalkenylarene, or mixtures thereof, wherein $R^1$ is methyl, ethyl, isopropyl, or n-butyl.

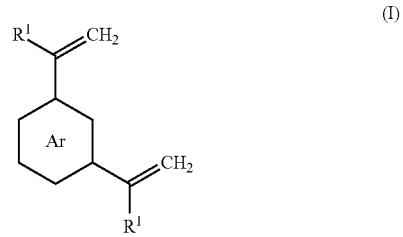

(I)

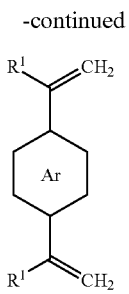

In embodiments, the DIAEA is selected from diisopropenylbenzenes (DIPEBs) and their substituted variants for producing the copolymer. Examples of DIPEBs include but are not limited to: 1,3-diisopropenylbenzene; 1,2-diisopropenylbenzene; 1,4-diisopropenylbenzene; 3,4-dicyclohexyl-1,2-diisopropenyl-benzene; 5-(3-methyl-cyclopentyl)-1,3-diisopropenylbenzene; 3-cyclopentyl-methyl-6-n-propyl-1,4-diisopropenylbenzene; 4-(2-cyclo-butyl-1-ethyl)-1,2-diisopropenylbenzene; 3-(2-n-propylcyclopropyl)-1,4-diisopropenylbenzene; 2-methyl-5-n-hexyl-1,3-diisopropenylbenzene; 4-methyl-1,2-diisopropenyl-benzene; 5-ethyl-1,3-diisopropenylbenzene; 3-methyl-1,4-diisopropenylbenzene; and mixtures thereof.

In embodiments, the DIAEA comprises DIPEB containing o-DIPEB, m-DIPEB, and p-DIPEB. In embodiments, the DIPEB contains >75, or >80, or >85, or >90, or >95, or >98, or up to 100 wt. % of m-DIPEB, based on total weight of the DIPEB.

In embodiments, the DIAEA comprises DIPEB having a moisture content of <150 ppm, or <120 ppm, or <100 ppm, or <80 ppm, based on total weight of the DIPEB.

In embodiments, the DIAEA comprises DIPEB having a 4-tert-buylcatechol (p-TBC) content of <120 ppm, or <100 ppm, or <90 ppm, or <80 ppm, based on total weight of the DIPEB.

In embodiments, the DIAEA comprises DIPEB, having a Hazen (APHA) color of <50, or <45, or <40, or <35, or <30, or <20 in a solvent having a concentration of 10%, measured according to ASTM D1209.

(DVA Monomers). The DVA is selected from the group consisting of divinylbenzene (DVB), ethylvinylbenzene (EVB), 1,3-divinylnaphthalene, 1,8-divinylnaphthalene, 1,4-divinylnaphthalene, 1,5-divinylnaphthalene, 2,3-divinylnaphthalene, 2,7-divinylnaphthalene, 2,6-divinylnaphthalene, 4,4'-divinylbiphenyl, 4,3'-divinylbiphenyl, 4,2'-divinylbiphenyl, 3,2'-divinylbiphenyl, 3,3'-divinylbiphenyl, 2,2'-divinylbiphenyl, 2,4-divinylbiphenyl, 1,2-divinyl-3,4-dimethylbenzene, 1,3-divinyl-4,5,8-tributylnaphthalene, 2,2'-divinyl 4-ethyl-4'-propylbiphenyl, and mixtures thereof. In embodiments, the DVA comprises a mixture of m-DVA and p-DVA.

Examples of the DVB include o-divinylbenzene (1,2-divinylbenzene), p-divinylbenzene (1,3-divinylbenzene), m-divinylbenzene (1,4-divinylbenzene), trivinylbenzene, or mixtures thereof. In embodiments, the DVB comprises two or more of 1,2-divinylbenzene (o-DVB), 1,3-divinylbenzene (m-DVB), 1,4-divinylbenzene (p-DVB), vinyl benzene, diethylbenzene, and EVB. In embodiments, the DVB contains 50-99, or 55-95, or 60-90, or 65-85, or 50-80, or >55, or >60, or >65, or >70, or >80 wt. % of m-DVB, based on total weight of the DVB.

In embodiments, the DVA comprises DVB having a weight ratio of m-DVB to p-DVB of 5:1-1:1, or 4:1-1:1, or 3:1-1:1, or 2:1-1:1.

In embodiments, the DVA comprises DVB having a purity of >90%, or >80%, or >70%, or >60%, or >50%, based on total weight of the DVB. The "purity" of the DVB is defined as the presence of single isomer of greater than certain percentage in the mixture of all isomers, e.g., o-DVB, m-DVB, p-DVB, vinyl benzene, or EVB.

In embodiments, the DVB comprises 40-50 wt. % of m-DVB, 15-25 wt. % of p-DVB, 20-35 wt. % of m-EVB, and 5-15 wt. % of p-EVB, based on total weight of the DVB.

In embodiments, the DVA comprises DVB having a 4-tert-buylcatechol (p-TBC) content of <1200 ppm, or <1100 ppm, or <1000 ppm, or <800 ppm, based on total weight of DVB.

In embodiments, the DVA comprises DVB having a moisture content of <130 ppm, or <120 ppm, or <100 ppm, or <80 ppm, based on total weight of DVB.

In embodiments, the DVA having sum of m-DVB, p-DVB, m-EVB, and p-EVB of >80, or >85, or >90, or >92, or >95 wt. %, based on total weight of the DVA.

In embodiments, the DVA comprises DVB containing m-DVB and p-DVB in an amount up to 99 wt. %, or 55-90 wt. %, or 55-85 wt. %, or 55-80 wt. %, based on total weight of the DVB.

In embodiments, DVA is DVB having a combination of m-EVB and p-EVB in amounts of <35, or <30, or <20, or <10, or <5, or 1-25, or <1, or <0.5, or <0.1 wt. %, based on total weight of DVB.

In embodiments, the DVA comprises DVB having a naphthalene content of <1000, or <800, or <700, or <500 ppm, based on total weight of the DVB.

In embodiments, the DVA comprises EVB having a weight ratio of m-EVB to p-EVB of 1:3 to 3:1, or 1:2.5 to 2.5:1, or 1:2 to 2:1.

In embodiments, the DVA comprises EVB having a purity of >90%, or >80%, or >70%, or >60%, or >50%, based total weight of the EVB. "Purity" of EVB is defined as the presence of single isomer of greater than certain percentage in the mixture of all isomers, e.g., o-EVB, or m-EVB, or p-EVB.

Examples of commercially available DVB monomer include DVB 80, DVB 55, DVB 63 from Deltech Corp.; DVB 55, DVB 63, and DVB HP from DuPont.

The DVA monomers, such as DVB, can be purified and/or fractionated to select isomers via a Simulated Moving Bed (SMB) or via moving bed chromatography method. The applied chromatographic fractionation process can include several SMB chromatography separation steps.

(Optionally Other Polymerizable Monomers). In embodiments, the DIAEA-DVA copolymer comprises other polymerizable monomers selected from the group consisting of styrene, 2-vinylbiphenyl, 3-vinylbiphenyl, 4-vinylbiphenyl, 1-vinylnaphthalene, 2-vinylnaphthalene, α-alkylated styrene, alkoxylated styrene, and mixtures thereof.

Non-limiting examples of the α-alkylated styrene include α-methylstyrene, α-ethylstyrene, α-propylstyrene, α-n-butylstyrene, α-isobutylstyrene, α-t-butylstyrene, α-n-pentylstyrene, α-2-methylbutylstyrene, α-3-methylbutyl-2-styrene, α-t-pentylstyrene, α-n-hexylstyrene, α-2-methylpentylstyrene, α-3-methylpentylstyrene, α-1-methylpentylstyrene, α-2,2-dimethylbutylstyrene, α-2,3-dimethylbutylstyrene, α-2,4-dimethylbutylstyrene, α-3,3-dimethylbutylstyrene, α-3,4-dimethylbutylstyrene, α-4,4-dimethylbutylstyrene, α-2-ethylbutylstyrene, α-1-ethylbutylstyrene, α-cyclohexylstyrene, and mixtures thereof. In embodiments, other alkylated styrene compounds include m-methylstyrene, p-methylstyrene, m-propylstyrene, p-propylstyrene, m-n-butylstyrene, p-n-butylstyrene, m-t-butylstyrene, p-t-butylstyrene, m-n-hexylstyrene, p-n-hexylstyrene, m-cyclohexylstyrene, p-cyclohexylstyrene, and mixtures thereof. Examples of the alkoxylated styrene include o-ethoxystyrene, m-ethoxystyrene, p-ethoxystyrene, o-propoxystyrene, m-propoxystyrene, p-propoxystyrene, o-n-butoxystyrene, m-n-butoxystyrene, p-n-butoxystyrene, o-isobutoxystyrene, m-isobutoxystyrene, p-isobutoxystyrene, o-t-butoxystyrene, m-t-butoxystyrene, p-t-butoxystyrene, o-n-pentoxystyrene, m-n-pentoxystyrene, p-n-pentoxystyrene, α-methyl-o-butoxystyrene, α-methyl-mbutoxystyrene, α-methyl-p-butoxystyrene, o-t-pentoxystyrene, m-t-pentoxystyrene, p-t-pentoxystyrene, o-n-hexoxystyrene, m-n-hexoxystyrene, p-n-hexoxystyrene, α-methyl-o-pentoxystyrene, α-methyl-m-pentoxystyrene, α-methyl-p-pentoxystyrene, o-cyclohexoxystyrene, m-cyclohexoxystyrene, p-cyclohexoxystyrene, o-phenoxystyrene, m-phenoxystyrene, p-phenoxystyrene, and mixtures thereof.

In embodiments, other polymerizable monomers include mono, di, or multi-functional compounds selected from butadiene, isoprene, piperylene, divinyltoluene, divinylpyridine, divinylxylene, vinyltriisopropenoxysilane, methoxytrivinylsilane, tetravinylsilane, diethoxydivinylsilane, o-ethyl vinyl benzene, m-ethylvinylbenzene, p-ethylvinylbenzene, 2-vinyl-2'-ethylbiphenyl, 2-vinyl-3'-ethylbiphenyl, 2-vinyl-4'-ethylbiphenyl, 3-vinyl-2'-ethylbiphenyl, 3-vinyl-3'-ethylbiphenyl, 3-vinyl-4'-ethylbiphenyl, 4-vinyl-2'-ethylbiphenyl, 4-vinyl-3'-ethylbiphenyl, 4-vinyl-4'-ethylbiphenyl, 1-vinyl-2-ethylnaphthalene, 1-vinyl-3-ethylnaphthalene, 1-vinyl-4-ethylnaphthalene, 1-vinyl-5-ethylnaphthalene, 1-vinyl-6-ethylnaphthalene, 1-vinyl-7-ethylnaphthalene, 1-vinyl-8-ethylnaphthalene, 2-vinyl-1-ethylnaphthalene, 2-vinyl-3-ethylnaphthalene, 2-vinyl-4-ethylnaphthalene, 2-vinyl-5-ethylnaphthalene, 2-vinyl-6-ethylnaphthalene, 2-vinyl-7-ethylnaphthalene, 2-vinyl-8-ethylnaphthalene, 2-vinyl-2'-propylbiphenyl, 2-vinyl-3'-propylbiphenyl, 2-vinyl-4'-propylbiphenyl, 3-vinyl-2'-propylbiphenyl, 3-vinyl-3'-propylbiphenyl, 3-vinyl-4'-propylbiphenyl, 4-vinyl-2'-propylbiphenyl, 4-vinyl-3'-propylbiphenyl, 4-vinyl-4'-propylbiphenyl, 1-vinyl-2-propylnaphthalene, 1-vinyl-3-propylnaphthalene, 1-vinyl-4-propylnaphthalene, i-vinyl-5-propylnaphthalene, 1-vinyl-6-propylnaphthalene, 1-vinyl-7-propylnaphthalene, 1-vinyl-8-propylnaphthalene, 2-vinyl-1-propylnaphthalene, 2-vinyl-3-propylnaphthalene, 2-vinyl-4-propylnaphthalene, 2-vinyl-5-propylnaphthalene, 2-vinyl-6-propylnaphthalene, 2-vinyl-7-propylnaphthalene, 2-vinyl-8-propylnaphthalene, 1,2,4-trivinylbenzene, 1,3,5-trivinylbenzene, 1,2,4-triisopropenylbenzene, 1,3,5-triisopropenylbenzene, 1,3,5-trivinylnaphthalene, 3,5,4'-trivinylbiphenyl, indene, alkylated indene, such as methylindene, ethylindene, propylindene, butylindene, t-butylindene, sec-butylindene, n-pentylindene, 2-methyl-butylindene, 3-methyl-butylindene, n-hexylindene, 2-methyl-pentylindene, 3-methyl-pentylindene, 4-methyl-pentylindene, alkycoxyindene such as methoxyindene, ethoxyindene, propoxyindane butoxyindene, t-butoxyindene, sec-butoxyindene, n-pentoxyindene, 2-methyl-butoxyindene, 3-methyl-butoxyindene, n-hexitosiindene, 2-methyl-pentoxyindene, 3-methyl-pentoxyindene, 4-methyl-pentoxyindene, acenaphthylenes such as alkylacenaphthylenes, halogenated acenaphthylenes, phenylacenaphthylenes, and mixtures thereof. Examples of the alkyl acenaphthylenes include 1-methyl acenaphthylene, 3-methyl acenaphthylene, 4-methyl acenaphthylene, 5-methyl acenaphthylene, 1-ethyl acenaphthylene, 3-ethyl acenaphthylene, 4-ethyl acenaphthylene, 5-ethyl acenaphthylene, and mixtures thereof. Examples of the halogenated acenaphthylenes include 1-chloroacenaphthylene, 3-chloroacenaphthylene, 4-chloroacenaphthylene, 5-chloroacenaphthylene, 1-bromoacenaphthylene, 3-bromoacenaphthylene, 4-bromoacenaphthylene, and 5-bromoacenaphthylene, and mixtures thereof. Examples of the phenylacenaphthylenes include 1-phenylacenaphthylene, 3-phenylacenaphthylene, 4-phenylacenaphthylene, 5-phenylacenaphthylene, and mixtures thereof.

In embodiments, the DIAEA-DVA copolymer further comprises repeat units derived from monomers including (i) a cyclodiene or a dimer thereof; (ii) an adduct of a cyclodiene and an acyclic diene; (iii) an allyl compound having two or more allyl groups; and any combination or subcombination thereof. Examples of cyclic polymerizable monomers include 1,3-cyclohexadiene, 1,4-cyclohexadiene, 1,3-cyclopentadiene, alkyl cyclopentadiene, trivinylcyclohexane, 2,4,6,8-tetravinyl-2,4,6,8-tetramethylcyclotetrasiloxane, 2,4,6,8,10-pentamethyl-2,4,6,8,10-pentavinylcyclopentasiloxane, or mixtures thereof.

(DIAEA-DVA Copolymer Structures). In embodiments, the DIAEA-DVA copolymer is any of a random, or a block copolymer. Alternatively, the copolymer can contain a homopolymer of DIAEA monomer end capped with DVA comonomer to obtain a DVA end-capped polyDIAEA.

The DIAEA-DVA copolymer can have at least one terminal group selected from (E), (F), (G), and (H), having structures shown below.

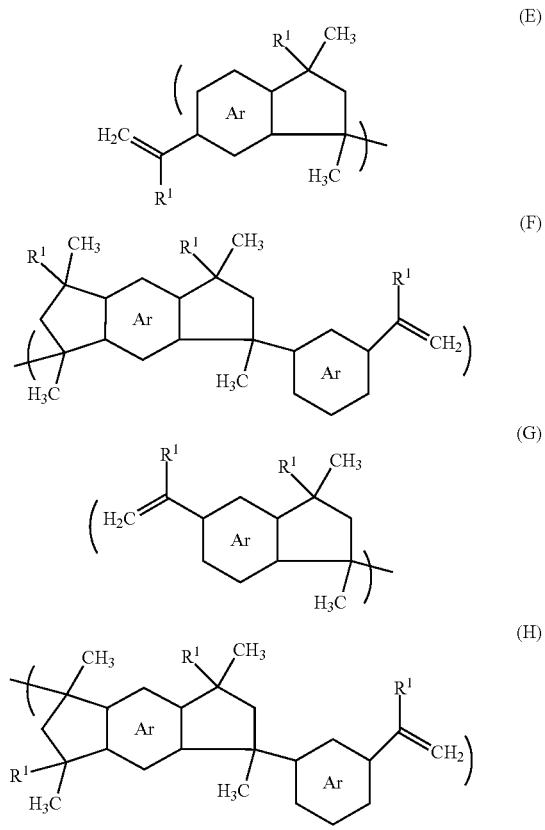

The copolymer can be suitably functionalized with a variety of functional groups, such as isocyanate, anhydride, carboxylic acid, carboxylic ester, hydroxyl, vinyl, urethane, amino, phosphino, silane, acrylate, methacrylate, or epoxy groups using methods known in the art.

(Methods of Preparation of DIAEA-DVA Copolymers). The copolymer can be prepared by processes known in the art as disclosed in U.S. Patent Publication 2022/0195109 A1, incorporated herein by reference. In embodiments, the copolymer is prepared by polymerizing DIAEA, DVA, and optionally other polymerizable monomers under cationic conditions in a suitable solvent in the presence of a catalyst, e.g., a Bronsted acid, or a Lewis acid. The addition of monomers can be carried at a suitable temperature, and the polymerization continued until all the monomers have essentially disappeared, or alternately, until an analysis of the reaction mixture indicates that the copolymer of sufficient molecular weight has formed. At the end of the reaction, the copolymer can be isolated by quenching the reaction mixture with water, followed by separating the organic solvent layer and stripping the solvent. Trace organics can be removed from the product under high vacuum. In embodiments, catalyst is used in amounts of 0.01-5, or 0.1-3, or 0.5-2, or 0.01-2 wt. %, based on total weight of monomers to be polymerized.

In embodiments, the DIAEA-DVA copolymer is obtained by photopolymerization of DIAEA, DVA, and optionally other polymerizable monomers in the presence of a photoinitiator known in the art. In embodiments, photopolymerization is achieved by using a radiation source, e.g., UV radiation, gamma radiation, electron-beam (E-beam), or microwave, for 10 sec.-60 min., or 20 sec.-30 min., or 30 sec.-10 min., or 10 sec.-60 sec.

In embodiments, the DIAEA-DVA copolymer is present in an amount of 25-90 wt. %, or 30-85 wt. %, or 35-80 wt. %, or 40-75 wt. %, or 45-70 wt. %, or >25 wt. % or <90 wt. %, based on the total weight of the thermosetting composition.

(Second Polymer).

The thermosetting composition further comprises a second polymer other than the DIAEA-DVA copolymer. In embodiments, the second polymer also functions as a cross-linker, obviating the need for a cross-linking agent.

The second polymer is selected from 1,2-polybutadiene, polyisoprene, polybutadiene-polyisoprene copolymers, polybutadiene-polystyrene-polydivinyl-benzene terpolymers, polyphenylene ether, curable cyclic olefins or their copolymers, polyacrylates, polydicyclopentadiene, styrene-isoprene-styrene copolymers, butadiene-acrylonitrile copolymers, acrylonitrile-styrene resin, acrylonitrile-butadiene-styrene resin, polyesters, styrenic block copolymers (SBCs), polyolefins, polytetrafluoroethylene (PTFE), polyetherimide (PEI), maleimide resin, cyanate ester resin, epoxy resin, phenolic resin, benzoxazine resin, polyamide resin, polyimide resin, polyphenylene sulfide, polyacetal, polysulfone, polyesterimides, polyether sulfone, polyether ketone, fluorine resin, polycarbonates, polyarylates, polyethers, polyamidoimides, polyurethanes, polyether ethersulfones, polybutadienediols, polyisoprenediol, polyisobutylenediol, hydrogenated polybutadienediol, polyethylenediol, polypropylenediol, polycaprolactonediol, polyethylene adipate, polybutylene adipate, polyethylene terephthalate, polybutylene terephthalate, silanol-terminal polydimethylsiloxane, amino-terminal polyethylene glycol, amino-terminal polypropylene glycol, amino-terminal polybutadiene, poly(3-hydroxybutyrate), poly(4-hydroxybutyrate), poly(3-hydroxybutyrate-co-3-hydroxyvalerate), poly(F-caprolactone), and mixtures thereof.

In embodiments, the second polymer is an epoxy resin comprising any of glycidyl groups, alicyclic epoxy groups, oxirane groups, ethoxyline groups, and the like. Examples include novolac-type epoxy resin, cresol-novolac epoxy resin, triphenolalkane-type epoxy resin, aralkyl-type epoxy resin, aralkyl-type epoxy resin having a biphenyl skeleton, biphenyl-type epoxy resin, dicyclopentadiene-type epoxy resin, heterocyclic-type epoxy resin, epoxy resin containing a naphthalene ring, a bisphenol-A type epoxy compound, a bisphenol-F type epoxy compound, stilbene-type epoxy resin, trimethylol-propane type epoxy resin, terpene-modified epoxy resin, linear aliphatic epoxy resin obtained by oxidizing olefin bonds with peracetic acid or a similar peracid, alicyclic epoxy resin, sulfur-containing epoxy resin, N,N, N',N'-tetraglycidyl-m-xylenediamine, N,N,N',N'-tetraglycidylmethylenedianiline, anthracene based epoxy resin, pyrene based epoxy resin, naphthalene based epoxy resin, and mixtures thereof. In embodiments, naphthalene-based epoxy resins include di-naphthalene based epoxy resin, tetra-naphthalene based epoxy resin, oxazolidone-containing di-naphthalene based epoxy resin, and the like.

In embodiments, the second polymer is acyanate ester resin comprising at least one unit of —O—CN. Cyanate esters can contain units of Ar—O—CN, wherein Ar is substituted or unsubstituted benzene, biphenyl, naphthalene, phenol novolac, bisphenol A, bisphenol A novolac, bisphenol F, bisphenol F novolac, or phenolphthalein. The Ar can be bonded with substituted or unsubstituted dicyclopentadienyl. The cyanate ester resin can be obtained from compounds selected from but not limited to polyfunctional aliphatic isocyanate compounds, polyfunctional alicyclic isocyanate compounds, polyfunctional aromatic isocyanate compounds such as trimethylene diisocyanate, tetramethylene diisocyanate, methylene diisocyanate, pentamethylene diisocyanate, 1,2-propylene diisocyanate, 1,3-butylene diisocyanate, dodecamethylene diisocyanate, 2,4,4-trimethyl hexamethylene diisocyanate and the like, 1,3-cyclopentene diisocyanate, 1,3-cyclohexane diisocyanate, 1,4-cyclohexane diisocyanate, isophorone diisocyanate, hydrogenated diphenylmethane diisocyanates, hydrogenated xylylene diisocyanate, hydrogenated tolylene diisocyanate, hydrogenated tetramethylxylylene diisocyanate, phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyldiisocyanate, 1,5-naphthalene diisocyanate, benzene methylene diisocyanate, 2,4'-diphenyl methane diisocyanate, 4,4'-diphenyl methane diisocyanate, carbodiimide modified product of 4,4'-diphenyl methane diisocyanate, polymethylene polyphenyl polyisocyanate, tolidine diisocyanate, xylene diisocyanate, tetramethyl xylene diisocyanate, hydrogenated diphenyl methane diisocyanate, hydrogenated xylene diisocyanate, norbonane diisocyanate, biuret modified hexamethylene diisocyanate, dimeric acid diisocyanate, and the like.

Examples of benzoxazine resin include bisphenol A benzoxazine, bisphenol F benzoxazine, phenolphthalein benzoxazine, and the like and mixtures thereof.

Examples of polyphenylene ether include polyphenylene oxide (PPO), polyphenylene ether oligomers or polymers. The polyphenylene ether can be functionalized with hydroxyl, vinyl, isocyanate, anhydride, carboxylic acid, carboxylic ester, urethane, amino, phosphino, epoxy, silane, acrylate, methacrylate, and mixtures thereof. In embodiments, the polyphenylene ether has 1.2 to 2.8 phenolic hydroxy groups per molecule and polydispersity index of 1.2-3, intrinsic viscosity of 0.03-0.2 deciliter per gram.

Polyurethane can be obtained by reacting isocyanates and polyols, in the presence of a thermal or photo initiator. Examples of isocyanates can include isocyanates described as above under cyanate ester resin. Examples of the polyol include an alkylene oxide adduct of bisphenol A, an alkylene oxide adduct of aromatic diol, polyester polyol, acryl polyol, polyether polyol, polycarbonate polyol, polyalkylene polyol, and the like. Other types of hydroxyl group containing compounds used in the preparation of the polyurethane include 2-hydroxy ethyl (meth)acrylate, 3-hydroxy propyl (meth)acrylate, 4-hydroxy-n-butyl (meth)acrylate, 2-hydroxy propyl (meth)acrylate, 2-hydroxy-n-butyl (meth)acrylate, 3-hydroxy-n-butyl (meth)acrylate, and mixtures thereof. A molar ratio of an isocyanate group (NCO) of the isocyanate compound to a hydroxyl group (OH) of the polyol is from 0.7 to 1.5, or 0.8 to 1.3, or 0.8 to 1.0.

Examples of rubbery polymers include natural rubber (NR), butyl rubber, halogenated butyl rubber, and EPDM (ethylene propylene diene monomer rubber), styrene-butadiene rubber (SBR), butadiene rubber, synthetic polyisoprene rubber, epoxylated natural rubber, polybutadiene rubber, high-cis polybutadiene rubber, ethylene propylene diene monomer rubber, ethylene propylene rubber, maleic acid-modified ethylene propylene rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, polyamide elastomers, and mixtures thereof.

The amount of a second polymer incorporated into the thermosetting composition is based on targeted end use application. In embodiments, the second polymer is added in an amount of 1-20 wt. %, or 2-15 wt. %, or 2-10 wt. %, or >1 wt. %, or >2 wt. %, or >5 wt. %, or >7 wt. %, or <20 wt. %, or <15 wt. %, based on total weight of the thermosetting composition.

(Filler):

The thermosetting composition further comprising a filler, which can help reduce the difference in the coefficient of thermal expansion (CTE) between a film containing the thermosetting composition and a metal substrate, e.g., a copper foil layer, effectively improving warpage properties. The filler is an inorganic filler known in the art. Examples include silica, calcium carbonate, magnesium carbonate, alumina, magnesia, clay, talc, calcium silicate, titanium oxide, antimony oxide, glass fiber, aluminum borate, barium titanate, strontium titanate, calcium titanate, magnesium titanate, bismuth titanate, titanium oxide, barium zirconate, calcium zirconate, boron nitride, silicon nitride, talc, mica, and the like.

In embodiments, the filler is silica having surface treated with at least one surface treating agent to enhance dispersibility of the silica in the film composition, in an amount of 0.1-10, or 0.5-5, or 0.1-3, or 0.2-2.5 wt. % of surface treating agent based on total weight of the silica. Examples of surface treating agents include silane coupling agents, titanium coupling agents, aluminum coupling agents, organosilazane compounds, etc. Other examples include methacrylic silane, acrylic silane, amino silane, imidazole silane, vinyl silane, epoxy silane, fluorine-containing silane, mercapto silane, alkoxy silanes, and mixtures thereof. Examples of silane include 3-glycidoxypropyltrimethoxysilane, 3-mercaptopropyltrimethoxysilane, 3-aminopropyltriethoxysilane, N-phenyl-3-aminopropyltrimethoxysilane, hexamethyldisilazane, phenyltrimethoxysilane, 3,3,3-trifluoropropyltrimethoxysilane, vinyltrimethoxysilane (VTMOS), vinyltriethoxysilane (VTEOS), vinyltributoxysilane, vinyldimethoxyethoxysilane, vinyldimethoxybutoxysilane, vinyldiethoxybutoxysilane, allyltrimethoxysilane, allyltriethoxysilane, methacryloxypropyltrimethoxysilane, methacryloxypropyltriethoxysilane, dimethoxymethylsilane, diethoxymethylvinylsilane, p-styryltrimethoxysilane, p-styryltriethoxysilane, and mixture thereof.

In embodiments, the inorganic filler has an average particle size of ≥10 nm, or ≥20 nm, or ≥50 nm, or ≥100 nm, or ≥150 nm, or 10 nm-1 microns, 20 nm-500 nm, 20 nm-200 nm, or 10 nm-100 nm, 50 nm-300 nm, or <5 µm, or <2 µm, or <1 µm, or <0.8 µm, or <0.6 µm.

In embodiments, the filler is silica selected from the group consisting of aerogel silica, silica xerogels, fumed silica, precipitated silica, amorphous silica, crystalline silica, hollow silica, and mixtures thereof. The silica can be derived from silicates, such as an alkali metal silicate, or ammonium silicate.

In embodiments, the filler is silica having a spherical shape with an aspect ratio of ≤2, or ≤1.5, or ≤1. In embodiments, the filler is silica having an elongate particle having an aspect ratio of ≥2.0, or ≥1.5, or ≥1.0.

In embodiments, the silica has a surface area of ≥1, or ≥2, or ≥5, or 1-60, or 5-30, or 10-50, or 1-15 m$^2$/g.

The amount of filler used in thermosetting composition is from 2-70 wt. %, or 5-60 wt. %, or 10-55 wt. %, or 12.9-50 wt. %, or 15-40 wt. %, or >5 wt. %, or >10 wt. %, or >20 wt. %, or >30 wt. % or <70 wt. %, based on total weight of the film composition.

(Optional Additives)

In embodiments, the thermosetting composition further comprises at least an additive selected from initiator, activators, stabilizers, neutralizing agents, thickeners, coalescing agents, slip agents, release agents, antioxidants, antiozonants, color change pH indicators, plasticizers, tackifiers, film forming additives, dyes, pigments, UV stabilizers, flame retardants, viscosity modifiers, wetting agents, deaerators, toughening agents, adhesion promoters, heat stabilizers, lubricants, flow modifiers, drip retardants, antistatic agents, processing aids, stress-relief additives, accelerator, water resistant agents, water-proofing agents, thermal conductivity-imparting agents, electromagnetic wave shielding property-imparting agents, radical scavengers, anti-scorching agent, and mixtures thereof.

Additives, if included, are present in amounts of 0.05-20, or 0.1-10, or 0.5-5, or 0.1-5 wt. %, based on total weight of the thermosetting composition.

(Optional Anti-Scorching Agent)

The thermosetting composition containing the DIAEA-DVA copolymer can be cross-linked without the need of initiators, e.g., peroxide, etc., or with very little needed. In some embodiments depending on the ratio of DIAEA to DVA and the storage condition, anti-scorching agents may be added. Anti-scorching agents prevent premature cross-linking of the vinyl groups in the copolymer before the targeted curing step. Anti-scorching agents allow the curing to happen at desired higher temperature. The effectiveness of the anti-scorching agent can be identified by the duration of scorch delay, the temperature at which the cross-linking begins, and the effect it has on the cure extent of the copolymer.

In embodiments, the anti-scorching agent is selected from the group consisting of styrene, alpha-methyl styrene monomer (AMSM), alpha-methyl styrene dimer (AMSD), alpha-methyl styrene oligomer (AMSO), hindered phenolic compounds which are substituted by an alkyl group, a phenyl group, or the like at the ortho position to at least one phenolic OH group, non-hindered phenolic compounds, amine compounds, thiourea compounds, benzimidazoles, mixtures and derivatives thereof. The alpha-methyl styrene derivatives can have one or more functional groups located on each ring and can be all same or different.

In embodiments, the alpha-methyl styrene dimer is selected from the group consisting of 2,4-diphenyl-4-methyl-1-pentene, 2,4-diphenyl-4-methyl-2-pentene, 1,2-trimethyl-3-phenylindane, cis-1,3-dimethyl-1,3-diphenyl cyclobutene, trans-1,3-dimethyl-1,3-diphenyl cyclobutene, and mixtures thereof.

In embodiments, the thermosetting composition contains a single anti-scorching agent or a mixture of two or more anti-scorching agents. The mixture of anti-scorching agents can have at least one anti-scorching agent based on the alpha-methyl styrene dimer, and/or based on hydrocarbons without any heteroatom or polar groups.

In embodiments, the anti-scorching agent is added to the DIAEA-DVA copolymer in solution, or to thermosetting composition, in amounts of 0.001-10, or 0.005-10, or 0.010-10, or 0.050-10, or 0.001-5, or 0.005-5, or 0.010-5, or 0.050-5 wt. %, based on total weight of the DIAEA-DVA copolymer.

(Optional Cross-Linking Agent)

As indicated, the thermosetting composition containing the DIAEA-DVA copolymer can be cross-linked without the need of initiators. In some embodiments and depending on the formulations, at least a curing or cross-linking agent is added.

In embodiments, the cross-linking agent has one or more functional groups, e.g., vinyl, allyl, acryloyl, methacryloyl, maleimide, isocyanurate, etc. Examples include triallyl isocyanurate, triglycidyl isocyanurate, glycidyl methacrylate, 4-(glycidyloxy)-styrene, vinyl benzyl alcohol, 2-(4-ethenylphenoxymethyl)oxirane, vinyl functionalized phosphonate oligomers, 9,10-dihydro-9-oxa-10-phosphaphenanthrene-10-oxide (DOPO), tetramethylene diisocyanate, hexamethylene diisocyanate, methylene diisocyanate, trimethylhexamethylene diisocyanate, 4,4-diphenylmethane diisocyanate, 2,4-tolylene diisocyanate, 2,6-tolylene diisocyanate, naphthalene-1,5-diisocyanate, o-xylylene diisocyanate, m-xylylene diisocyanate, 24-tolylene dimer, bicycloheptane triisocyanate, 4,4-methylene bis(cyclohexylisocyanate), isophorone diisocyanate, tetramethylguanidine, 2-methylimidazole, 1-benzyl-2-methylimidazole, 2-ethyl-4-methylimidazole, adipic acid hydrazide, naphthalenecarboxylic acid hydrazide, N,N-dimethylaniline, N,N-dimethylbenzylamine, 2,4,6-tris(dimethylaminomethyl)phenol, 4,4'-diaminodiphenylmethane, 4,4'-diaminodiphenylsulfone, 3,3'-diaminodiphenylsulfone, m-phenylenediamine, m-xylylenediamine, diethyl toluenediamine, diethylenetriamine, triethylenetetramine, isophoronediamine, bis(aminomethyl) norbornane, bis(4-aminocyclohexyl)methane, dimer acid ester of polyethyleneimine, maleic anhydride (MA), phthalic anhydride (PA), hexahydro-o-phthalic anhydride (HEPA), tetrahydrophthalic anhydride (THPA), pyromellitic dianhydride (PMDA), trimellitic anhydride (TMA), diallyl bisphenol compound, diallyl phthalate (DAP), cycloaliphatic carboxylic acid anhydrides (such as cyclohexane-1,2-dicarboxylic anhydride), α,α'-bis(t-butylperoxy-m-isopropyl)benzene, and mixtures thereof.

In embodiments, the cross-linking agent is a copper (II) or aluminum (III) salt of an aliphatic or aromatic carboxylic acid. Other examples include copper (II) or aluminum (III) salts of acetate, stearate, gluconate, citrate, benzoate, and like.

In embodiments, cross-linking agent is used in amounts of up to 15, or 0.5-12, or 1-10, or 2-8, or 0.1-5, or 0.5-5 wt. %, based on total weight of the thermosetting composition.

(Methods to Prepare Thermosetting Compositions)

The DIAEA-DVA copolymer is provided in a dry form, e.g., pellets, powder, or flakes, or in solution form by mixing into a solvent (with or without the addition of anti-scorching agent), then mixed with other components in solvent, forming the thermosetting composition. The thermosetting composition is used as a film in flexible metal clad laminates.

The composition is prepared by any processes known in the art, e.g., compounding, or blending the DIAEA-DVA copolymer, filler, a crosslinking agent, a second polymer, and other optional components. The compounding can be achieved by conventional compounding operation, e.g., Banbury mixers, Brabender mixers, Farrel continuous mixers, and the like. The mixing temperatures is selected for an intimate blend of the components without premature cross-linking.

In embodiments, the components are mixed in a solvent or a mixture of solvents to obtain a dispersion or solution. The solvent is selected from protic, aprotic, polar, nonpolar solvents and mixtures thereof. Examples include cyclopentane, cyclohexane, cycloheptane, cyclooctane, hexane, heptane, nonane, decane, paraffinic oil, methyl-tert-butyl ether, tetrahydrofuran (THF), dioxan, ethyl acetate, dimethylsulfoxide (DMSO), dimethylformamide (DMF), methanol, ethanol, propanol, butanol, toluene, xylene, p-xylene, methyl ethyl ketone (MEK), limonene, α-pinene, β-pinene, and mixtures thereof. The concentration of the thermosetting composition in the solvent(s) can be in the range from 2-60%, or 5-50%, or 10-40%, or 30-60%, or 40-60%, or 20-50%, based on total weight of the solution/dispersion.

In embodiments, an anti-scorching agent is added to the solution in an amount of 0-15 wt. %, or <15 wt. %, or <12 wt. %, or <10 wt. %, or <5 wt. %, or <2 wt. %, or <1 wt. % based on the total weight of the thermosetting composition.

(Film Layer Containing Thermosetting Composition)

The thermosetting composition is useful for making into films for use in flexible metal clad laminates. Films can be formed by methods including but not limited to casting, electrospinning, coating such as, flow coating, roll coating, bar coating, spray coating, spin coating, slot-die coating or ultrasonic spray coating, and other process in art for coating a polymer in solution.

In embodiments, a film layer is formed by solvent casting. Solvent is removed and the film is dried at room temperature with or without vacuum.

In embodiments, a film layer is formed having a thickness of 10 μm-1 mm, or 15 μm-500 μm, or 10-300 μm, or 20 μm-200 μm, or 30 μm-150 μm, or 50 μm-125 μm.

(Flexible Metal Clad Laminate—FMCL)

FMCL is formed comprising at least a film as describe above. In embodiments, a metal-clad laminate is obtained by laminating the film comprising the thermosetting composition with a metal foil, e.g., copper foil. The copper foil is an electrolytic copper foil or a rolled copper foil having a surface roughness of 0.5-5 mm, or <5 mm, or <4 mm, or >3 mm, or >2 mm, or >1 mm, or >0.8 mm, or >0.5 mm or the like.

In embodiments, the metal-clad laminate is obtained by casting the film directly on the metal foil and then curing the film at a desired temperature to obtain the cured film on the metal foil, which is then used for different end use applications.

In embodiments, the film is present in between two metal foils in the metal-clad laminate. The metal-clad laminate can have at least one adhesive layer between the cured film and the metal foil. The adhesive layer can be selected from any known adhesive layers in prior art, employed in the manufacturing of metal-clad laminates. In embodiments, one side of the copper foil is chemically treated with a silane coupling agent selected from the group consisting of epoxy silane coupling agent, vinyl silane coupling agent, acrylate-based silane coupling agents, or a mixture therefrom.

(Properties of DIAEA-DVA Copolymers)

The DIAEA-DVA copolymer has a good combination of molecular weight ranges and relatively broad molecular weight distributions (polydispersity index), which makes it more soluble in non-polar solvents, enhancing processability.

In embodiments, the DIAEA-DVA copolymer has a solubility in a hydrocarbon solvent at 25° C. in a period of less than 4 hours of at least 10, or >20, or >30, or >50, or >70, or <99, or 10-75, or 20-65, or 10-60 wt. %, based on total weight of the solvent. Examples of solvents include hexane, heptane, octane, isooctane, cyclohexane, varnish maker and painter's naphtha (VM&P naphtha), petroleum ether, toluene, xylene, and mixtures thereof.

In embodiments, the DIAEA-DVA copolymer as a solid when dissolved in a hydrocarbon solvent forms a substantially gel-free solution, wherein <2, or <5, or <10, or <15 wt. % of the solid remains insoluble in the solvent.

In embodiments, the DIAEA-DVA copolymer solution, in hydrocarbon solvent, has a Gel Content of 0.05-5, or 0.1-4.5, or 1-4, or <5, or <2, or <1 wt. %, based on total weight of the copolymer.

In embodiments, the DIAEA-DVA copolymer has a decomposition onset temperature of 200-450° C., or 220-420° C., or 240-400° C., or <600° C., or <500° C. or >300° C.

In embodiments, the DIAEA-DVA copolymer has a glass transition temperature ($T_g$) of 50-300° C., or 60-250° C., or 70-220° C., or 80-200° C., or 100-250° C., or 120-220° C. or >150° C., or >200° C., or >280° C., measured using differential scanning colorimetry (DSC) according to ASTM D3418 or dynamic mechanical analyzer (DMA).

In embodiments, the DIAEA-DVA copolymer has a moisture absorption coefficient of <0.1, or <0.08, or <0.05, measured at 25° C. according to ASTM D570.

In embodiments, the DIAEA-DVA copolymer has a density of >0.9, or >1.0, or 1.0-2.0, or 1.0-1.50 g/cc.

(Properties of Film Layer Containing DIAEA-DVA Copolymer): In embodiments, a film layer is formed from a thermosetting composition comprising: (i) 30-85 wt. % of a DIAEA-DVA copolymer, (ii) 2-10 wt. % of a second polymer, (iii) 12.9-50 wt. % of a filler, and (iv) 0.1-10 wt. % of at least an additive, based on total weight of the DIAEA-DVA copolymer and second polymer. The film is characterized as having excellent cross-linking characteristics, toughness, flexibility, good chemical and oxidative stability, and enhanced fire retardancy useful for electronic applications.

In embodiments, the film has a Dk (permittivity) of <2.3, or <2.4, or <2.55, or <2.50, or <2.45, <3.5 measured at 10 GHz, according to ASTM D2520.

In embodiments, the film has a Df (loss tangent) of <0.002, or <0.0018, or <0.0015, or 0.002-0.0001, or 0.0015-0.0001, or 0.0005-0.0008 measured at 10 GHz, according to ASTM D2520.

In embodiments, the film has a water vapor transmission rate (WVTR) of 0.5-25 or >0.5, or >1, or >1.5, or >2, or >3, or >5, or >7, or >10, or >12, or <25 g mil/m² day measured in accordance with ASTM method F-1249.

In embodiments, the film has a water uptake the film has a water uptake capacity of <0.5%, based on total weight of the film.

In embodiments, the film has a coefficient of thermal expansion (CTE) of <30, or <28, or <25, or <22 ppm/° C., as measured using TMA over a range of −50 to 300° C., according to ASTM E 228.

In embodiments, the film exhibits good adhesion to metals, e.g., aluminum, copper, etc. In embodiments, the film has a 90° peel strength to metal of 0.1-1.0, or 0.2-0.9, or 0.3-0.7 N/m performed according to IPC 650 2.4.19.

In embodiments, the film has a thermal conductivity of >0.1, or >0.15, or >0.2, or >0.25 W/m·K, according to ASTM E 1530.

In embodiments, the film has a tensile elongation of >10%, according to IPC-TM 650 2.4.19.

(Properties of Flexible Metal-Clad Laminate)

Adhesion Strength with Copper Foil: In embodiments, the film has a 90° peel strength to metal of >0.1, or >0.2, or 0.1-1.0, or 0.2-0.9, or 0.3-0.7 N/m, performed according to IPC 650 2.4.19.

(Applications of Thermosetting Composition)

The thermosetting composition can be used in coating applications for automotive, e.g., refinishes, primers, basecoats, undercoats, overcoats, clear coats, etc. Power cables can be obtained from the thermosetting composition, particularly, cables in high voltage applications, and useful in both, alternating current (AC) and direct current (DC) applications.

In embodiments, the thermosetting composition is used in the preparation of printed circuit boards (PCBs). In embodiments, the thermosetting composition is used in the manufacturing of flexible metal clad laminates. Such laminates can be used to fabricate components such as circuit boards for use in electronic devices, e.g., televisions, computers, laptop computers, tablet computers, printers, cell phones, video games, DVD players, stereos, electronic encapsulants, etc.

EXAMPLES

The following illustrative examples are intended to be non-limiting. The following test methods can be used.

Glass transition temperature ($T_g$) is measured by Dynamic Mechanical Analysis (DMA) according to ASTM 4065.

Dielectric constant Dk and dielectric loss factor Df: Tested according to according to ASTM D2520.

Coefficient of Thermal Linear Expansion (CTE) is obtained by measuring thermal expansion values while increasing the temperature by 10° C. per minute to 400° C. by using a thermomechanical analyzer (TMA), and then, taking an average of the values measured at a temperature range of 100° C. to 200° C.

Tensile modulus is measured by using a universal testing machine of Instron Co., based on IPC-TM-650, 2.4.19.

Dimensional change is measured according to IPCTM-650, 2.2.4 Method B. At four vertices of a square sample having a machine direction (MD) and a transverse direction 20 (TD) of 275×255 mm, holes for recognizing a position were formed.

The water vapor transmission rate (WVTR) of thermosetting composition film is measured in accordance with ASTM method F-1249. The units of measure on WVTR are grams of water per day multiplied by the film thickness per square meter of film. This is a calculated number based upon film thickness and water vapor transmission rate. The films were run at 37.8° C. at 100% relative humidity (RH).

Water uptake is measured using a TA-3000 thermal analyzer (Mettler Toledo, Columbus, Ohio). Water absorption of thermosetting composition film is determined by placing strips of film in distilled water for 24 hours at room temperature. The film samples are run and analyzed for water content by thermal gravimetric analysis at a rate of 10° C./minute between room temperature and 400° C. and analyzed from RT to 160° C. and 160° C. to 400° C.

Example 1

Preparation of copolymer of 1,3-DIPEB and divinylbenzene containing 37.26 g m-DVB, 36.91 g p-DVB, 10.36 g m-EVB, and 14.59 g p-EVB. In a 3-liter 3-neck flask charged with 921 g of cyclohexane and heated up to 65° C., added 0.0125 g of triflic acid with continuous stirring. A mixture of 64.5 g of 1,3-DIPEB, 185.7 g of divinylbenzene, and 250 g of cyclohexane was added over 30 min. After addition of the mixture, the reaction content was quenched with 750 mL of water and 2 g of $NaHCO_3$ followed by heating the reaction content at 65° C. for another 15 minutes. The aqueous layer was removed from the bottom. The remaining organic layer was washed with water several times. The copolymer product was recovered by removing the solvent.

Example 2

In this example, the surface of silica filler was surface treated with vinyltrimethoxylsilane (VTMOS). 200 g of spherical silica was well-suspended in 200 g of dried toluene under nitrogen at 500 RPM. The mixture was heated to reflux (110° C.) under nitrogen and distilled out at least 10 g of toluene. 5 g of VTMOS was added to the mixture, and reflux continued for 3 hours. After the system cooled down to ambient under nitrogen, toluene was filtered, and silica was washed with dried toluene to remove any trace of unattached VTMOS. The treated silica was re-dispersed in toluene at room temperature under 500 RPM, then dried under vacuum.

Example 3

A number of films were prepared with the copolymer of 1,3-DIPEB and 1,3-divinylbenzene in Example 1 (in toluene solution), with and without the addition of a second polymer, and with and without the addition of the treated silica of Example 2.

The components in the film formulations are as follows:

D1192 is a sequential styrene-butadiene-styrene block copolymer from Kraton Corporation having a relatively high vinyl content and a polystyrene content of 30%.

TEMPOL or 4-hydroxy-TEMPO is used as an inhibitor/anti-scorching agent.

PTZ or phenothiazine is an aromatic amine used as anti-scorching agent.

In the example, resin samples were formed with the treated silica in Example 2 (in toluene), the copolymer of Example 1 in toluene (Resin 1), second polymer D1192 in toluene (as Resin 2) and additives. Films of 100 microns thickness were formed by solution casting on PET film of 38-micron thickness. The films were dried at room temperature for 60 minutes, followed by transfer to Mylar PET release liner, then heated to 120-280° C. for 5-15 minutes. Film formulations and test results are shown in Table 1.

Example 4

A film with the composition of Example 1 was made by solution casting on PET film. The film was dried at room temperature by transfer to PET release liner, then heated to a temperature between 120 to 180° C. to cure the sample. Gel Content Test was conducted. The film sample containing the copolymer was shown to have a Gel Content of >90%.

Example 5

Flexible film samples 6 and 7 of Example 3 are then heat treated (cured) at a 120° C. and measured for properties. Films are measured for dielectric properties. It is expected that the films to have Dk of <3.5 and Df of <0.005 (both measured at 10 GHz, according to ASTM D2520), a coefficient of thermal expansion of <30 ppm/° C., per TMA over a range of −50 to 300° C.; a 90° peel strength to metal of >0.6 N/m performed according to IPC 650 2.4.19; a water uptake capacity of <0.5%, based on total weight of the film; a tensile elongation of >10% according to IPC-TM 650 2.4.19.

Example 6

Film 6 with the composition as shown in Example 3 is made by solution casting on PET film. The film is dried at room temperature for 60 min by transfer to PET release liner. The dry film after removing the toluene solvent is laminated onto a copper foil having a thickness of ~35 μm thick or 1.4 mils on both the upper and lower sides. In the next step, coated copper foil is vacuum laminated and cured for 120 min in a press at a curing pressure of 50 kg/cm2, and a curing temperature of 200° C. A flexible cooper laminated plate of 0.76 mm-1.52 mm thickness is obtained, which can be tested for mechanical properties.

Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "includes" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 1

| Film | 1,3-DIPEB/ DVB copolymer wt. % solution | 1,3-DIPEB/ DVB copolymer solution (g) | D1192 wt. % solution | D1192 solution (g) | Wt. ratio Resin 1/ Resin 2 | Additives TEMPOL ppm | Additives PTZ ppm | Treated Silica Silica wt. % | Treated Silica Silica (g) | Treated Silica Toluene (g) | Final conc. % | Film flexibility |
|---|---|---|---|---|---|---|---|---|---|---|---|---|
| 1 | 83.4 | 12.0 | — | — | — | 10 | 250 | 50 | 10 | 5 | 71 | Brittle |
| 2 | 83.4 | 2.0 | — | — | — | 12.5 | 200 | 50 | 10 | 5 | 71 | Brittle |
| 3 | 83.4 | 12.0 | — | — | — | 15 | 150 | 50 | 10 | 5 | 72 | Brittle |
| 4 | 83.4 | 5.0 | 20 | — | — | 10 | 0 | 50 | 5 | 0 | 50 | Brittle |
| 5 | 83.4 | 6.0 | 20 | 1.25 | 20:1 | 10 | 0 | 48.8 | 5 | 0 | 49 | Flexible |
| 6 | 83.4 | 6.0 | 20 | 2.5 | 10:1 | 10 | 0 | 47.6 | 5 | 0 | 48 | Soft, flexible |
| 7 | 83.4 | 5.8 | 20 | 6 | 4:1 | 10 | 0 | 50 | 6 | 0 | 40 | Soft, flexible |

The invention claimed is:

1. A film comprising a thermosetting composition, the thermosetting composition comprises, based on the total weight of the thermosetting composition:
   a) a copolymer of (i) a diisoalkenylarene and (ii) a divinylarene containing m-divinylarene and p-divinylarene, in a mole ratio of (i) to (ii) of 15:1 to 1:15, the copolymer being present in an amount of 30-85 wt. %;
   b) a second polymer in an amount of 2-10 wt. %;
   c) a filler in an amount of 13-50 wt. %; and
   d) an optional additive in an amount up to 10 wt. %;
   wherein the film has:
      a thickness of 10 to 300 μm;
      a dielectric constant (Dk) of <3.5, measured at 10 GHz, according to ASTM D2520;
      a dissipation Factor (Df) of <0.005, measured at 10 GHz, according to ASTM D2520;
      a coefficient of thermal expansion of <30 ppm/° C., as measured using TMA over a range of −50 to 300° C., according to ASTM E 228.
      a 90° peel strength to metal of >0.6 N/m performed according to IPC 650 2.4.19;
      a water uptake capacity of <0.5%, based on total weight of the film; and
      a tensile elongation of >10%, according to IPC-TM 650 2.4.19.

2. The film of claim 1, wherein the copolymer has a Gel Content of >90%.

3. The film of claim 1, wherein the m-divinylarene is m-divinylbenzene, the p-divinylarene is p-divinylbenzene, and wherein amount of m-divinylbenzene and p-divinylbenzene is up to 99 wt. %, based on total weight of the divinylarene.

4. The film of claim 1, wherein divinylarene further comprises m-ethylvinylbenzene and p-ethylvinylbenzene in an amount of <35 wt. %, based on total weight of the divinylarene.

5. The film of claim 1, wherein the m-divinylarene is m-divinylbenzene, the p-divinylarene is p-divinylbenzene, and the weight ratio of m-divinylbenzene to p-divinylbenzene is 5:1 to 1:5.

6. The film of claim 1, wherein the copolymer comprises: (a) 30 to 95 wt. % of polymerized diisoalkenylarene; (b) 5 to 70 wt. % of polymerized divinylarene; and (c) 0 to 15 wt. % of at least another polymerizable monomer.

7. The film of claim 6, wherein the at least another polymerizable monomer is selected from the group consisting of styrene, 2-vinylbiphenyl, 3-vinylbiphenyl, 4-vinylbiphenyl, 1-vinylnaphthalene, 2-vinylnaphthalene, α-alkylated styrene, alkoxylated styrene, and mixtures thereof.

8. The film of claim 1, wherein the diisoalkenylarene is a diisopropenylbenzene, and wherein the diisopropenylbenzene comprises 75 wt. % m-diisopropenylbenzene, based on total weight of the diisopropenylbenzene.

9. The film of claim 8, wherein the diisopropenylbenzene has at least one of: a moisture content of <150 ppm; a 4-tert-buylcatechol content of <120 ppm; and a Hazen (APHA) color of <50 in a solvent having a concentration of 10%, measured according to ASTM D1209.

10. The film of claim 1, wherein the second polymer is selected from the group consisting of: polyphenylene ether, curable cyclic olefins or their copolymers, polydicyclopentadiene, polyesters, styrenic block copolymers (SBCs), polyolefins, polytetrafluoroethylene (PTFE), polyetherimide (PEI), maleimide resin, cyanate ester resin, epoxy resin, phenolic resin, benzoxazine resin, polyamide resin, polyimide resin, polyphenylene sulfide, polysulfone, polyesterimides, polyether sulfone, polyether ketone, polyurethane, polyether ethersulfones, poly(3-hydroxybutyrate), poly(4-hydroxybutyrate), poly(3-hydroxybutyrate-co-3-hydroxyvalerate), poly(ε-caprolactone), and mixtures thereof.

11. The film of claim 1, wherein the filler is selected from the group consisting of silica, alumina, barium sulfate, talc, clay, mica powder, aluminum hydroxide, magnesium hydroxide, calcium carbonate, magnesium carbonate, magnesium oxide, boron nitride, aluminum borate, barium titanate, calcium titanate, magnesium titanate, bismuth titanate, titanium oxide, barium zirconate, calcium zirconate, and mixtures thereof.

12. The film of claim 11, wherein the filler has an average particle size of 10 nm-1 μm.

13. The film of claim 11, wherein the filler is a silica selected from the group consisting of aerogel silica, silica xerogels, fumed silica, precipitated silica, amorphous silica, crystalline silica, hollow silica, and mixtures thereof.

14. The film of claim 1, wherein the optional additive is selected from the group consisting of initiators, activators, stabilizers, thickeners, coalescing agents, slip agents, release agents, antioxidants, antiozonants, color change pH indicators, plasticizers, tackifiers, film forming additives, UV stabilizers, fillers, flame retardants, viscosity modifiers, wetting agents, toughening agents, adhesion promoters, heat stabilizers, flow modifiers, antistatic agents, processing aids, stress-relief additives, water resistant agents, thermal conductivity-imparting agents, radical scavengers, anti-scorching agent, and mixtures thereof.

15. The film of claim 1, wherein the copolymer has a decomposition onset temperature of 200-450° C.

16. The film of claim 1, wherein the copolymer has a glass transition temperature ($T_g$) of 50-300° C.

17. A flexible metal clad laminate comprising:
   at least one film containing the thermosetting composition of claim 1; and
   a metal foil bonded to at least one surface of the film.

18. The flexible metal clad laminate of claim 17, wherein the metal foil is copper, and wherein the copper foil has a ten-point average roughness (Rz) of ≤5.0 µm.

19. The flexible metal clad laminate of claim 17, wherein the film is bonded to the copper foil by thermal compression.

20. The flexible metal clad laminate of claim 17, wherein the film is bonded to the copper foil by an adhesive layer between the film and the copper foil.

* * * * *